(12) United States Patent
Hager et al.

(10) Patent No.: US 7,440,582 B2
(45) Date of Patent: Oct. 21, 2008

(54) TRIM PANEL WITH INTEGRALLY FORMED ATTACHMENT MEMBER

(75) Inventors: Richard A. Hager, Commerce Township, MI (US); Daniel V. Beckley, Fenton, MI (US); Lisa Ann Kidd, West Bloomfield, MI (US)

(73) Assignee: Intier Automotive Inc., Newmarket (CA)

( * ) Notice: Subject to any disclaimer, the term of this patent is extended or adjusted under 35 U.S.C. 154(b) by 149 days.

(21) Appl. No.: 10/533,407

(22) PCT Filed: Oct. 27, 2003

(86) PCT No.: PCT/US03/34070

§ 371 (c)(1),
(2), (4) Date: Oct. 11, 2005

(87) PCT Pub. No.: WO2004/039636

PCT Pub. Date: May 13, 2004

(65) Prior Publication Data

US 2006/0145376 A1 Jul. 6, 2006

Related U.S. Application Data

(60) Provisional application No. 60/421,990, filed on Oct. 29, 2002.

(51) Int. Cl.
*H04R 1/02* (2006.01)
*A47B 81/06* (2006.01)

(52) U.S. Cl. ............... 381/389; 381/332; 381/386; 381/395; 181/199

(58) Field of Classification Search ............... 381/302, 381/86, 87, 332, 389, 395, 300, 334
See application file for complete search history.

(56) References Cited

U.S. PATENT DOCUMENTS

| 4,326,599 | A | * | 4/1982 | Thompson et al. | .......... 181/175 |
|---|---|---|---|---|---|
| 5,273,243 | A | * | 12/1993 | Abdallah et al. | ............ 248/27.1 |
| 5,699,438 | A | * | 12/1997 | Smith et al. | ................. 381/386 |
| 6,061,460 | A | | 5/2000 | Seo | |
| 6,377,695 | B1 | | 4/2002 | Azima et al. | |

FOREIGN PATENT DOCUMENTS

EP 0281084 A 3/1988

(Continued)

*Primary Examiner*—Wayne Young
*Assistant Examiner*—Dionne H Pendleton
(74) *Attorney, Agent, or Firm*—Honigman Miller Schwartz and Cohn LLP

(57) ABSTRACT

A trim panel (10) includes an integrally formed attachment member (14) for mounting an acoustic device (16), such as a loudspeaker, an exciter, a piezoelectric transducer, or the like, directly to the trim panel (10) without the need of a separate mounting member. The acoustic device (16) is attached to the trim panel (10) by use a twist and lock fastening feature (18) in the form of a ramp surface (24) that draws the acoustic device (16) toward the trim panel (10) as the acoustic device (16) is rotated about the attachment member (14). Once the acoustic device (16) is rotated into place, one or more detents (26) are provided on the trim panel (10) and one or more corresponding detent grooves or recesses (32) are provided on the acoustic device (16) to lock the acoustic device (16) securely in place. The integrally formed attachment member (14) enables the inner and outer surfaces (11, 12) of the trim panel (10) to be a generally continuous surface.

17 Claims, 3 Drawing Sheets

FOREIGN PATENT DOCUMENTS

| | | |
|---|---|---|
| FR | 2809691 A1 | 12/2001 |
| JP | 63110047 | 5/1988 |
| JP | 07058535 | 3/1995 |
| JP | 2002286834 | 10/2003 |

* cited by examiner

TRIM PANEL WITH INTEGRALLY FORMED ATTACHMENT MEMBER

BACKGROUND OF THE INVENTION

1. Field of the Invention

The inventions relates in general to the attachment of an accessory to a trim panel, and in particular to a trim panel with an integrally formed attachment member for mounting an acoustic device, such as a loudspeaker, an exciter, a piezoelectric transducer or the like, to the trim panel.

2. Description of the Related Art

An acoustic device, such as an electrodynamic exciter, applies bending wave energy to a trim panel to cause the trim panel to resonate and produce an acoustic output. Typically, the exciter comprises a magnet assembly rigidly fixed to a housing to define an annular gap, and a voice coil and coil former assembly disposed in the annular gap and rigidly fixed to the trim panel near to the geometric center thereof.

Typically, the acoustic device is mounted to the trim panel by using a separate mounting member, such as a mounting plate, that is fixedly attached to the trim panel using one or more fasteners, such as screws, or the like. After the separate mounting member is fixedly attached to the trim panel, such as by bonding, the acoustic device can be attached to the trim panel. However, the need for a separate mounting member and the time required to fixedly attach the separate mounting member to the trim panel increases the overall cost associated with mounting the acoustic device to the trim panel.

SUMMARY OF THE INVENTION

The inventors of the present invention have recognized these and other problems associated with a separate mounting member and the additional step necessary for fixedly attaching the separate mounting member to the trim panel. To this end, the inventors have developed a trim panel with an integrally formed attachment member for mounting an acoustic device, such as a loudspeaker, an exciter, a piezoelectric transducer, or the like, directly to the trim panel without the need of a separate mounting member. The acoustic device is attached to the trim panel by using a twist and lock fastening feature in the form of an attachment member with a ramp surface that draws the acoustic device toward the trim panel as the acoustic device is rotated about the attachment member. Once the acoustic device is rotated into place, one or more detents are provided on the trim panel and corresponding one or more corresponding recesses are provided on the acoustic device to lock the acoustic device securely in place.

DESCRIPTION OF THE PREFERRED EMBODIMENT

Figure 1:
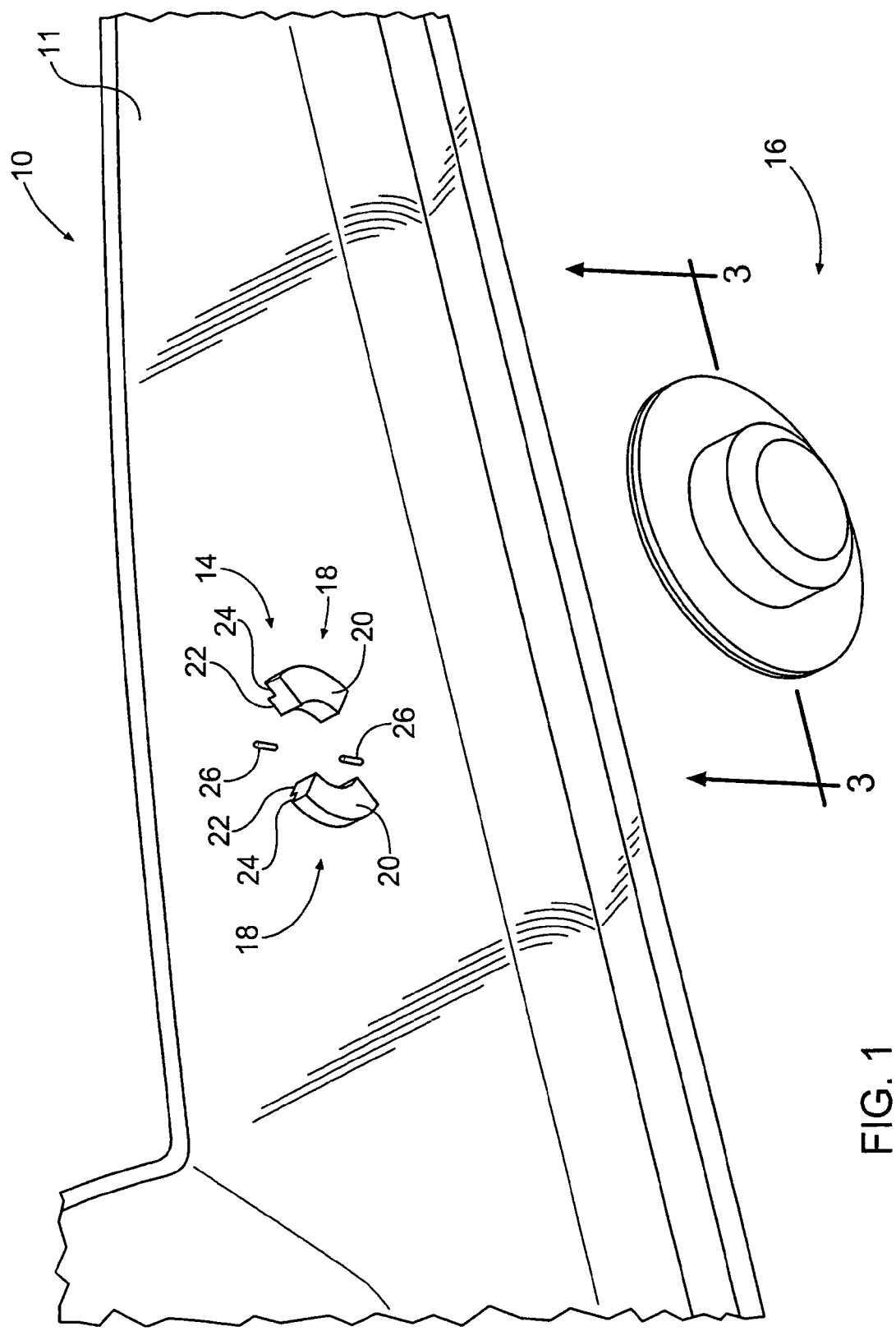
FIG. 1 shows a front perspective view of a trim panel with an integrally formed attachment for mounting a loudspeaker according to an embodiment of the invention.
Figure 2:
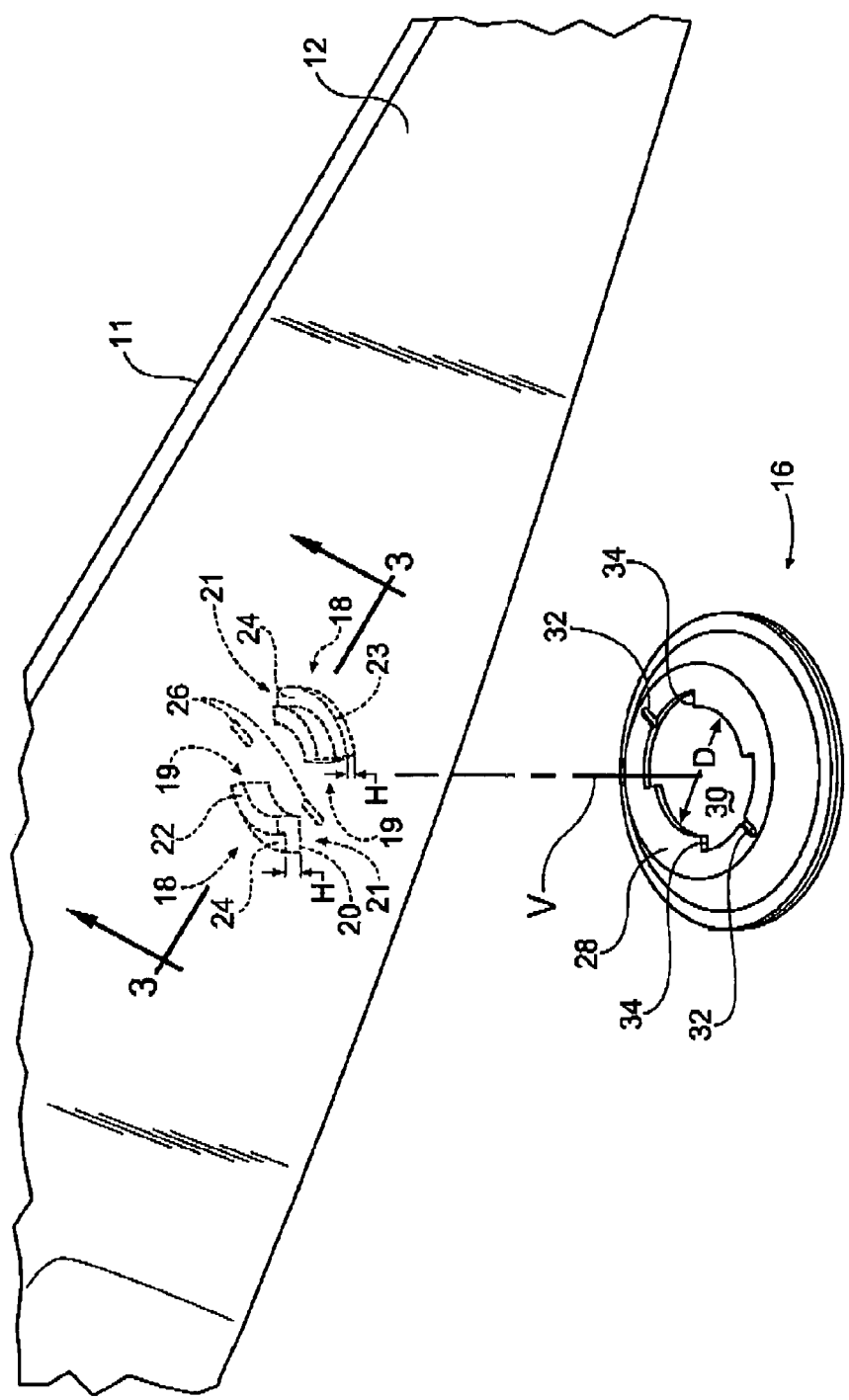
FIG. 2 shows a rear perspective view of the trim panel of FIG. 1.
Figure 3:
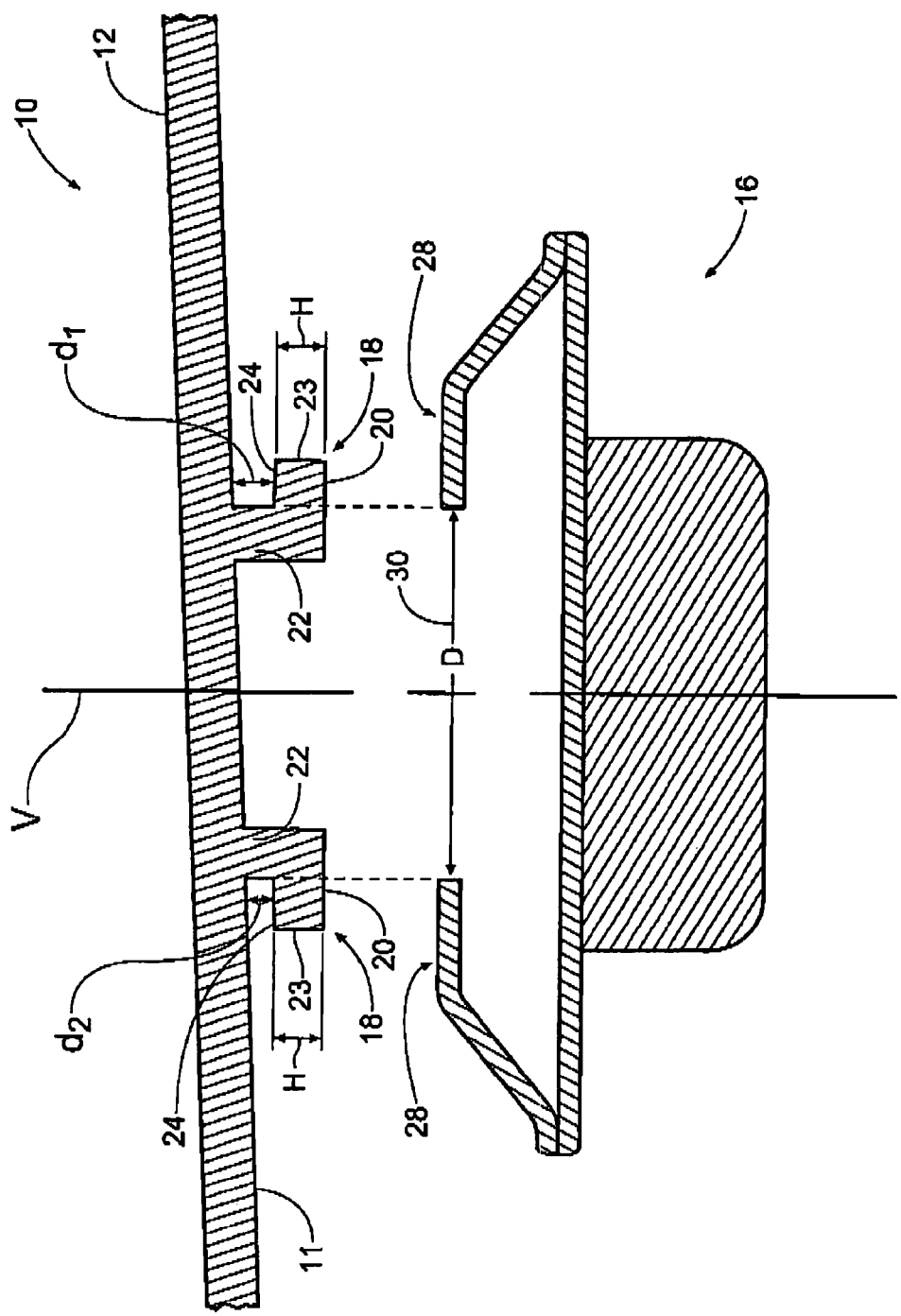
FIG. 3 shows a cross section view of the trim panel of FIG. 1 taken along line 3-3 of FIG. 1.

Referring to FIGS. 1-3, a trim panel 10 includes an inner surface 11 and an outer surface 12. The trim panel 10 may be in the form of a vehicular headliner, door panel, valence panel, dashboard, package tray, or the like. For example, in the illustrated embodiment, the trim panel 10 may form a door panel in which the inner surface 11 forms a Class "B" surface that faces away from the interior of the vehicle and is not visible to the occupants, and the outer surface 12 forms a Class "A" surface that faces the interior of the vehicle and is visible to the occupants.

The trim panel 10 includes an attachment member 14 for attaching an acoustic device 16, such as a loudspeaker, an exciter, a piezoelectric transducer, or the like, to the trim panel 10. One aspect of the invention is that the attachment member 14 is integrally formed with the trim panel 10 using known molding techniques, such as injection molding, or the like. For example, the attachment member 14 can be integrally formed with the trim panel 10 by using slides in a mold tool (not shown) that forms the trim panel 10. Preferably, the attachment member 14 is integrally formed with the trim panel 10 at a location of the trim panel 10 that has a substantially flat topography to accommodate the substantially flat profile of the acoustic device 16. However, the invention can be practiced at other locations of the trim panel that do not have a substantially flat topography.

Another aspect of the invention is that integrally formed attachment member 14 enables the inner and outer surfaces 11, 12 to be generally continuous, unlike conventional mounting systems in which an opening may be necessary for mounting the acoustic device 16.

In the illustrated embodiment, the attachment member 14 includes a pair of opposing, substantially identical mounting portions 18. Each mounting portion includes a first end 19, a second end 21, and a side surface 23 between the first end 19 and the second end 21. Each mounting portion 18 is substantially arcuate in shape having a lower mounting portion 20 and an upper mounting portion 22. The lower mounting portion 20 has a greater width or radial thickness than the upper mounting portion 22 such that a ledge 24 is formed in the upper surface of the lower mounting portion 20, as best seen in FIGS. 2 and 3. The side surface 23 extends between the lower mounting portion 20 and the ledge 24. The side surface 23 extending between the lower mounting portion 20 and the ledge 24 is defined by a height H. The upper mounting portion 22 projects outwardly substantially perpendicular to the inner surface 11 of the trim panel 10, whereas the lower mounting portion 20 projects outwardly substantially perpendicular to the upper mounting portion 22.

As best seen in FIG. 3, the ledge 24 of one of the mounting members 18 is separated from the inner surface 11 at a first distance, $d_1$, and the ledge 24 of the other one of the mounting members 18 is separated from the inner surface 11 at a second distance, $d_2$. In the illustrated embodiment, the distance, $d_1$, is greater than the distance, $d_2$, such that the ledges 24 provide a ramp surface to move the acoustic device 16 toward the trim panel 10 when the acoustic device 16 is rotated in a first direction about the vertical axis, V. On the other hand, the ramp surface causes the acoustic device 16 to move away from the trim panel 10 when the acoustic device 16 is rotated in a second direction that is opposite to the first direction. While the illustrated embodiment shows a pair of substantially identical opposing mounting members 18, it will be appreciated that the invention can be practiced with any desired number of mounting members, for example, a single mounting member forming an uninterrupted mounting member having a circular shape. The mounting member 18 also includes a pair of detents 26 for locking the acoustic device 16 in place.

Referring now to FIGS. 2 and 3, the acoustic device 16 includes a substantially planar upper surface 28 and an opening 30 for mounting the acoustic device 16 to the attachment member 18. The upper surface 28 includes a pair of opposing detent grooves or recesses 32 capable of receiving the detents 26 integrally formed in the trim panel 10 to lock the acoustic device 16 in place. The opening 30 in the upper surface 28 of the acoustic device 16 is approximately the same dimension as the distance between the outer surfaces of the upper mounting portions 22, as indicated by the dashed lines in FIG. 3. The opening 30 also includes a pair of cutouts 34 for allowing the acoustic device 16 to be inserted over the lower mounting portions 20 of the attachment member 18.

To install the acoustic device 16 to the trim panel 10, the acoustic device 16 is aligned with the attachment member 18 such that the cutouts 34 are directly over the lower mounting portions 20. Then, the acoustic device 16 is moved toward the attachment member 18 until the lower mounting portions 20 are received within the cutouts 34. Next, the acoustic device 16 is rotated in a first, counterclockwise direction to move the acoustic device 16 toward the trim panel 10. The acoustic device 16 is rotated until the upper surface is in close proximity to the trim panel 10 and the detents 26 are received in the detent grooves or recesses 32 to lock the acoustic device 16 in place. When the detents 26 are received in the detent grooves 32, the cutouts 34 are not positioned over the lower mounting portions 24 of the attachment member, as shown in FIG. 2. To remove the acoustic device 16, the acoustic device 16 is rotated in a second, clockwise direction.

As described above, the acoustic device 16 is attached to the trim panel 10 by use a twist and lock fastening feature in the form of the attachment member 18 with a ramp surface that draws the acoustic device 16 toward the trim panel 10 as the acoustic device 16 is rotated about the attachment member 18. In addition, the integrally formed attachment member 18 does not require a separate mounting plate for mounting the acoustic device 16 to the trim panel, unlike conventional mounting devices, thereby eliminating the need for holes in the trim panel for attaching the separate mounting plate to the trim panel. Thus, the integrally formed attachment member 18 provides a more aesthetic Class "A" surface than conventional attachment members.

While the invention has been specifically described in connection with certain specific embodiments thereof, it is to be understood that this is by way of illustration and not of limitation, and the scope of the appended claims should be construed as broadly as the prior art will permit.

What is claimed is:

1. An apparatus for retaining an acoustic device, comprising:
 a trim panel having an inner surface and an outer surface; and
 an attachment member integrally formed with said inner surface of the trim panel, wherein the attachment member includes
  at least one mounting portion, wherein the at least one mounting portion includes
   a first end,
   a second end opposite the first end,
   a side surface between the first end and the second end, wherein the side surface defines the at least one mounting portion in include a ramping, increasing height as the side surface extends from the first end to the second end, and
   a ledge surface between the first end and the second end, wherein the ledge surface extends from an is substantially perpendicular to the side surface, wherein the ledge surface is spaced from and opposes the inner surface of the trim panel at a distance, wherein the ramping, increasing height of the side surface defines the ledge surface to be a ramp surface, wherein the distance between the ledge surface and the inner surface of the trim panel is greater proximate the first end of the at least one mounting portion than that of the second end of the at least one mounting portion.

2. The apparatus according to claim 1, wherein the attachment member includes two mounting portions.

3. The apparatus according to claim 2 further comprising at least one detent integrally formed with said inner surface of the trim panel, wherein the at least one detent is disposed between the two mounting portions.

4. The apparatus according to claim 1, wherein the at least one mounting portion is defined to include an L-shaped cross-section.

5. The apparatus according to claim 1, wherein the at least one mounting portion is defined to include an arcuate shape.

6. An assembly, comprising:
 a trim panel having an inner surface and an outer surface; and
 an attachment member integrally formed with said inner surface of the trim panel, wherein the attachment member includes at least one mounting portion, wherein the at least one mounting portion includes a first end, a second end opposite the first end, a side surface between the first end and the second end, wherein the side surface defines the at least one mounting portion to include a ramping, increasing height as the side surface extends from the first end to the second end, and a ledge surface between the first end and the second end, wherein the ledge surface extends from an is substantially perpendicular to the side surface, wherein the ledge surface is spaced from and opposes the inner surface of the trim panel at a distance, wherein the ramping, increasing height of the side surface defines the ledge surface to be a ramp surface, wherein the distance between the ledge surface and the inner surface of the trim panel is greater proximate the first end of the at least one mounting portion than that of the second end of the at least one mounting portion; and
 an acoustic device including at least one mounting surface, wherein the at least one mounting surface interfaces with the ramp surface to dispose the acoustic device adjacently proximate the inner surface of the trim panel.

7. The assembly according to claim 6, wherein the attachment member includes two mounting portions, wherein the assembly further comprises at least one detent integrally formed with said inner surface of the trim panel, wherein the at least one detent is disposed between the two mounting portions.

8. The assembly according to claim 7 further comprising two mounting surfaces, wherein the acoustic device further comprising at least one recess disposed between the two mounting surfaces, wherein the at least one recess interfaces with the at least one detent of the inner surface of the trim panel.

9. The assembly according to claim 6, wherein the at least one mounting portion is defined to include an L-shaped cross-section.

10. The assembly according to claim 6, wherein the at least one mounting portion is defined to include an arcuate shape.

11. The assembly according to claim 6, wherein the acoustic device further comprises
 an opening, wherein the opening includes a pair of cutouts.

12. An assembly, comprising:

an acoustic device;

a trim panel having an inner surface and an outer surface; and an attachment member integrally formed with said inner surface of the trim panel, wherein the attachment member includes means for simultaneously ramping and rotationally moving the acoustic device about an axis extending through the acoustic device and trim panel to axially move the acoustic device relative the trim panel about the axis, wherein the means includes at least one mounting portion, wherein the at least one mounting portion includes a first end, a second end opposite the first end, a side surface between the first end and the second end, wherein the side surface defines the at least one mounting portion to include a ramping, increasing height as the side surface extends from the first end to the second end, and a ledge surface between the first end and the second end, wherein the ledge surface extends from an is substantially perpendicular to the side surface, wherein the ledge surface is spaced from and opposes the inner surface of the trim panel at a distance, wherein the ramping, increasing height of the side surface defines the ledge surface to be a ramp surface, wherein the distance between the ledge surface and the inner surface of the trim panel is greater proximate the first end of the at least one mounting portion than that of the second end of the at least one mounting portion.

13. The assembly according to claim 12, wherein the attachment member includes two mounting portions, wherein the two mounting portions includes means for locking the acoustic device in place.

14. The assembly according to claim 13, wherein the means for locking the acoustic device includes at least one detent integrally formed with said inner surface of the trim panel, wherein the at least one detent is disposed between the two mounting portions.

15. The assembly according to claim 14, wherein the acoustic device further comprises two mounting surfaces, and means for receiving the at least one detent, wherein the means for receiving the at least one detent includes at least one recess disposed between the two mounting surfaces.

16. The assembly according to claim 12, wherein the acoustic device further comprises means for allowing the acoustic device to be inserted over the attachment member.

17. The assembly according to claim 16, wherein the means for allowing includes cutouts formed in an opening of the acoustic device.

* * * * *

UNITED STATES PATENT AND TRADEMARK OFFICE
CERTIFICATE OF CORRECTION

PATENT NO. : 7,440,582 B2  
APPLICATION NO. : 10/533407  
DATED : October 21, 2008  
INVENTOR(S) : Richard A. Hager et al.

Page 1 of 1

It is certified that error appears in the above-identified patent and that said Letters Patent is hereby corrected as shown below:

In Claim 1, Column 3, line 60, please change "in" to -- to --.

Signed and Sealed this

Thirtieth Day of December, 2008

JON W. DUDAS  
*Director of the United States Patent and Trademark Office*